Feb. 22, 1927.
E. W. HORNUNG
1,618,709
FRAME FOR AUTOMOBILE CURTAIN WINDOWS
Filed July 22, 1925
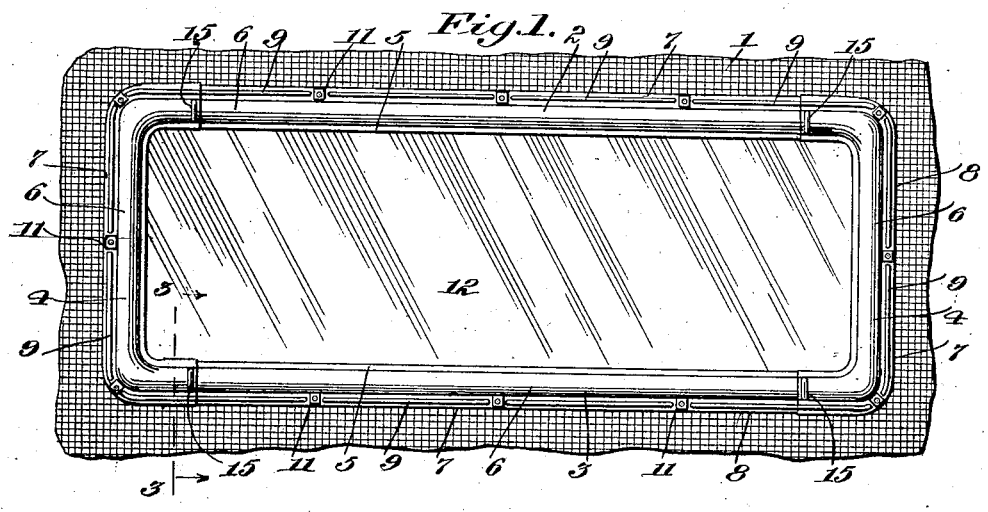
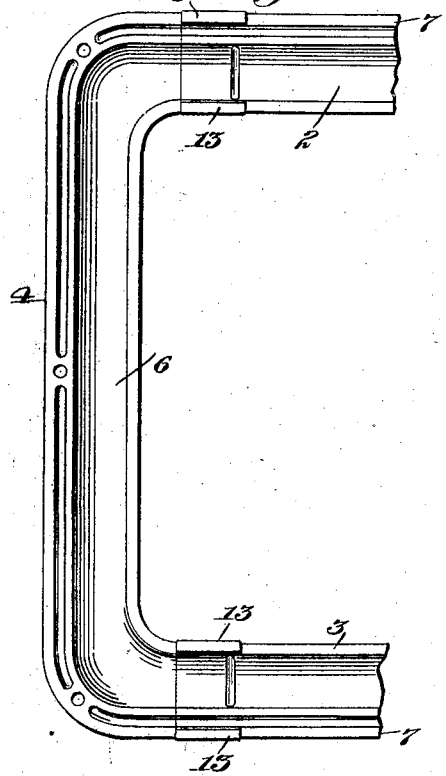
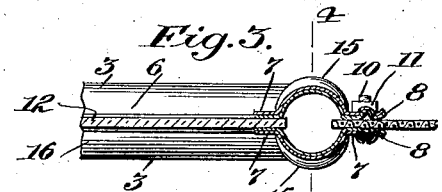
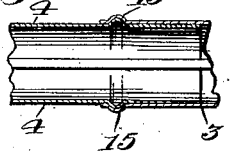
Inventor:
Ernest W. Hornung
by Jas. L. Skidmore
his Atty.

Patented Feb. 22, 1927.

1,618,709

UNITED STATES PATENT OFFICE.

ERNEST W. HORNUNG, OF CLEVELAND, OHIO.

FRAME FOR AUTOMOBILE CURTAIN WINDOWS.

Application filed July 22, 1925. Serial No. 45,225.

This invention relates to metallic frames for securing and rigidly retaining plate or other glass panes in the windows of automobile curtains of fabric, leather or other suitable flexible material attached to the back or sides of an automobile top, although the same may also be used in connection with the windows of awnings, vehicle covers and elsewhere, if desired.

The main object of the invention is to provide a simple, durable, economical, pleasing, attractive, and thoroughly efficient metallic window frame for automobile tops which may be easily and readily installed and removed.

Another object of the invention is to so construct the improved metallic frame as to prevent tearing of the fabric to which the window is applied, due to the weight and constant vibration of the glass pane.

Another object of the invention is to so construct the metallic frame that each end piece is formed of a single compound piece of metal combining the two corners into one, for each end of the frame, thus eliminating the cost of stamping and handling two corner elbows for each end, or four corner elbows for the complete frame.

Another object of this invention is to provide novel fastening means for securely uniting the end pieces and top and bottom members of the frame together, serving to hide or detract attention from the joint; to strengthen the joint connection of the said members, and to eliminate the possibility of the members being accidentally pulled apart after being properly assembled.

Further objects of the invention are to provide a metallic frame possessing an attractive and ornamental appearance, and so constructed that each securing nut is locked in a recess formed between the rolled or curved outer edge of the frame. the main curved outwardly extended semi-circular portion of the frame and the terminal ends of the intermediate outwardly extended beaded portions thereof, thereby eliminating the customary use of a wrench or pliers for holding the nut when adjusting or tightening the fastening screws or bolts, as well as preventing any accidental loss of the securing nuts.

The foregoing and such other objects as may appear from the ensuing description are attained by the construction, arrangement, location and combination of the several parts hereinafter more fully described, illustrated in the accompanying drawings, and particularly pointed out in the claims appended hereto, it being understood that slight changes in the precise form, proportions and minor details of the construction may be resorted to without departing from the spirit or sacrificing any of the advantages of the invention.

In the accompanying drawings forming a part of the specification, it will be seen that:

Figure 1 is an outside elevation of the improved metallic frame embodying my invention, showing the curtain fabric broken away.

Figure 2 represents an enlarged inner face view of one of the end pieces of the frame securely clamped to the top and bottom members, showing said members broken away.

Figure 3 is an enlarged section taken in the plane of the dotted lines 3—3, Fig. 1, looking in the direction of the arrow, and Figure 4 is a section taken in the plane of the dotted lines 4—4, Fig. 3.

In the embodiment of my novel metallic frame as illustrated, the numeral 1 designates the fabric or leather curtain forming a portion of the top of an automobile, 2 the inside top member of the frame, 3 the inside bottom member, and 4 indicates each compound inside end member of the frame, all members constituting the outer side of the frame being formed in substantially the same manner as the members forming the inner side thereof. The entire frame is composed of any suitable or desirable sheet metal, and of any desirable shape, preferably rectangular, oval or oblong, the top, bottom and compound end pieces each being formed with an inwardly extended flange 5, and adjacent said flange each member and end piece is curved or rounded to form an enlarged cross-sectionally semi-circular outward extension 6, and adjacent thereto and integral therewith is a laterally extended flange 7 terminating with a rolled or curved outer edge 8 having a rounded effect and being turned away from the curtain fabric when attached to prevent the edges of the frame from contact with and cutting in the fabric, thereby preventing any tendency of tearing the curtain under all conditions. Formed on the said flange 7 and forming outwardly extended beads, is a series of auxiliary beaded portions 9 for the purpose hereinafter described.

The laterally extended flange 7 formed on the top and bottom members and the end pieces of both the inner and outer portions of the frame are provided with a suitable number of perforations or openings therethrough, adapted to register with each other for the reception of the securing screws or threaded bolts 10, which in connection with the securing nuts 11 serve the purpose of removably fastening the metallic frame securely to the curtain, with the glass plate or pane 12 rigidly clamped and fixedly secured between and in contact with the inwardly extended flange 5 formed on both the inner and outer members of the frame, as will be readily understood.

It will be perceived that each of the securing nuts are adapted to be seated in a recess formed on the outer face of the laterally extended flange 7 at the terminal end of each of the outwardly extended beads 9, and between the semi-circular extension 6 and the outwardly extended curved outer edge 8, thus securely locking each nut in the position such as clearly shown in Fig. 1 so that it is prevented from turning when adjusting the fastening screws or bolts 10, hence said beads 9 serve the double purpose of ornamentation of the frame, and means in connection with the extension 6 and edge 8, for preventing the undue or accidental turning of the nut and insures its retention in its proper place at all times.

It will be readily evident that since the outer edges of the frame members are turned or curved outwardly to prevent contact there can be no cutting in of the edges to tear or otherwise damage the curtain, and that each nut seated in the recess locks itself between the outer edge of the frame, the outer edge of the extension 6 and the terminal ends of the beaded portions 9.

It will be observed that special means are employed for securing the compound end pieces to the top and bottom members of both the inner and outer sections constituting the entire frame, said means consisting in forming each compound end piece 4 at its inner terminal end portion and at its upper and lower edges with an extended flange 13, said flanges being turned over and suitably stamped or pressed tightly into contact with the inner face of the top and bottom member at and near each end of said member and overlapping a portion of the inner face of each top and bottom member, and by the same method used in stamping out the several metallic sections constituting the frame a semi-circular recess or depression is formed in the inner face of the end pieces and top and bottom members, terminating in a bead formation 15 on the outer surface thereof, as clearly shown in the drawings, said overlapping compressed flanges 13 and the recessed and beaded formation 15, when the parts are assembled serving to securely lock the end pieces to the top and bottom members; to strengthen the joint connection thereof and prevent the accidental separation of the parts.

It will be understood that the use of sectional dies to stamp any given size frame, is much less expensive and requires less material, than the large dies adapted to stamp the one piece frame, since the more sizes of the one piece frame required, means an equal number of sets of dies, which dies are quite expensive, while any required number of sizes may be had from sectional dies, hence in making frames of the type hereinbefore described, only one strip or side is to be contended with, by using sectional dies the blanking dies for the long strips (top and bottom) are constructed to blank the longest strips required, or in other words, for a frame of maximum length and they do not have to be shortened by removing sections in order to stamp a shorter strip or blank. The cutting knives remain permanently as originally set, and to produce shorter strips, a narrower sheet of metal of the desired size is fed into the dies and cut to size without injury to the cutting knives, hence I am enabled to make any length of window frame from the same set of sectional dies. Further, there is a considerable saving of material over the old type of one piece frame, since the stamping of the one piece frame leaves a scrap center piece from each frame of greater area than the area of the frame itself, and this scrap is eliminated by stamping sections and assembling them into complete frames, this saving of material reduces the cost appreciably, particularly in the use of more expensive metals, such as aluminum, nickel, zinc or brass.

I am aware of the use of sectional frames where the top, bottom and end strips are joined with corner elbows, this method involving the stamping and handling of eight parts, while I dispense with the corner elbows ordinarily employed, and use a compound end piece combining the two corners and the end piece or strip, into one integral piece, for each end of the frame, thereby dispensing with the cost of stamping and handling two corner elbows for each end strip.

It will be obvious that this frame is simple in its construction and capable of being installed by persons inexperienced in mechanics, and when finished, said frame presents a neat, pleasing and attractive appearance which compares favorably with the metallic frames heretofore employed for the purposes set forth.

Frames of this type may be made in any size, shape or contour, and from any suitable or desirable metal or other material, and with any desirable finish or enamel.

Having thus described my invention what I claim and desire to secure by Letters Patent is:

1. A frame for an automobile curtain window, comprising an inner and an outer metallic frame adapted to engage with opposite sides of the fabric and pane, each frame being formed with an enlarged outwardly extended cross-sectionally semi-circular portion and an inwardly laterally extended flange, a laterally outwardly extended flange terminating with an outwardly curved edge, a series of outwardly extended beads formed on said outwardly extended flange, and a series of recesses forming seats for the frame securing nuts between the cross-sectionally semi-circular portion the outer curved edge and the terminals of said beads.

2. A frame of the character described, comprising an inner and an outer frame adapted to engage the opposite sides of the fabric and pane, each frame being formed with an enlarged cross-sectionally semi-circular extension, an outwardly extended flange terminating with an upwardly and outwardly curved edge, a series of outwardly extended beads formed on said flange, a series of recesses forming locking seats for the securing nuts between the terminal end of each of said beads the outer side of said extension and the inner side of said curved edge, and each frame being composed of a top and bottom member, and a compound end member, said members having means formed at the end portions thereof for locking them securely together.

ERNEST W. HORNUNG.